United States Patent
Gerhold

[11] 3,888,762
[45] June 10, 1975

[54] FLUID CATALYTIC CRACKING PROCESS
[75] Inventor: Clarence G. Gerhold, Palatine, Ill.
[73] Assignee: Universal Oil Products Company, Des Plaines, Ill.
[22] Filed: Apr. 12, 1973
[21] Appl. No.: 350,665

Related U.S. Application Data
[63] Continuation-in-part of Ser. No. 297,170, Oct. 12, 1972, abandoned, which is a continuation-in-part of Ser. No. 139,433, May 3, 1971, abandoned.

[52] U.S. Cl. ............... 208/120; 23/288 S; 208/153; 208/164
[51] Int. Cl. ..... B01j 9/20; C10g 11/18; C10g 37/02
[58] Field of Search .................. 208/120, 164, 153

[56] References Cited
UNITED STATES PATENTS

| | | | |
|---|---|---|---|
| 2,312,230 | 2/1943 | Belchetz | 208/157 |
| 2,439,811 | 4/1948 | Jewell | 208/74 |
| 2,487,132 | 11/1949 | Hemminger | 208/150 |
| 2,892,773 | 6/1959 | Hirsch et al. | 208/213 |
| 2,965,454 | 12/1960 | Harper | 23/288 |
| 3,071,538 | 1/1963 | Lawson | 208/120 |
| 3,182,011 | 5/1965 | Friedman | 208/78 |
| 3,679,576 | 7/1972 | McDonald | 208/74 |

Primary Examiner—Delbert E. Gantz
Assistant Examiner—G. E. Schmitkons
Attorney, Agent, or Firm—James R. Hoatson, Jr.; Thomas K. McBride; William H. Page

[57] ABSTRACT

A fluid catalytic cracking process in which the activity of a catalyst blend, which comprises freshly regenerated catalyst and recycled coke-containing catalyst and which contacts a hydrocarbon feed in a riser reaction zone to produce a desired product yield structure, is controlled by recycling a portion of the coke-containing catalyst which has contacted the feed in the reaction zone back to the reaction zone without passing through a regeneration zone. Although this coke-containing catalyst has reduced activity because of the coke contamination, it is not completely spent. Activity of the catalyst blend can therefore by varied by controlling the amount of the coke-containing catalyst recycled.

By so controlling the catalyst activity the process of this invention allows the refiner to directly and conveniently control the conversion level and product distribution obtained from the reaction zone.

8 Claims, 1 Drawing Figure

PATENTED JUN 10 1975 3,888,762
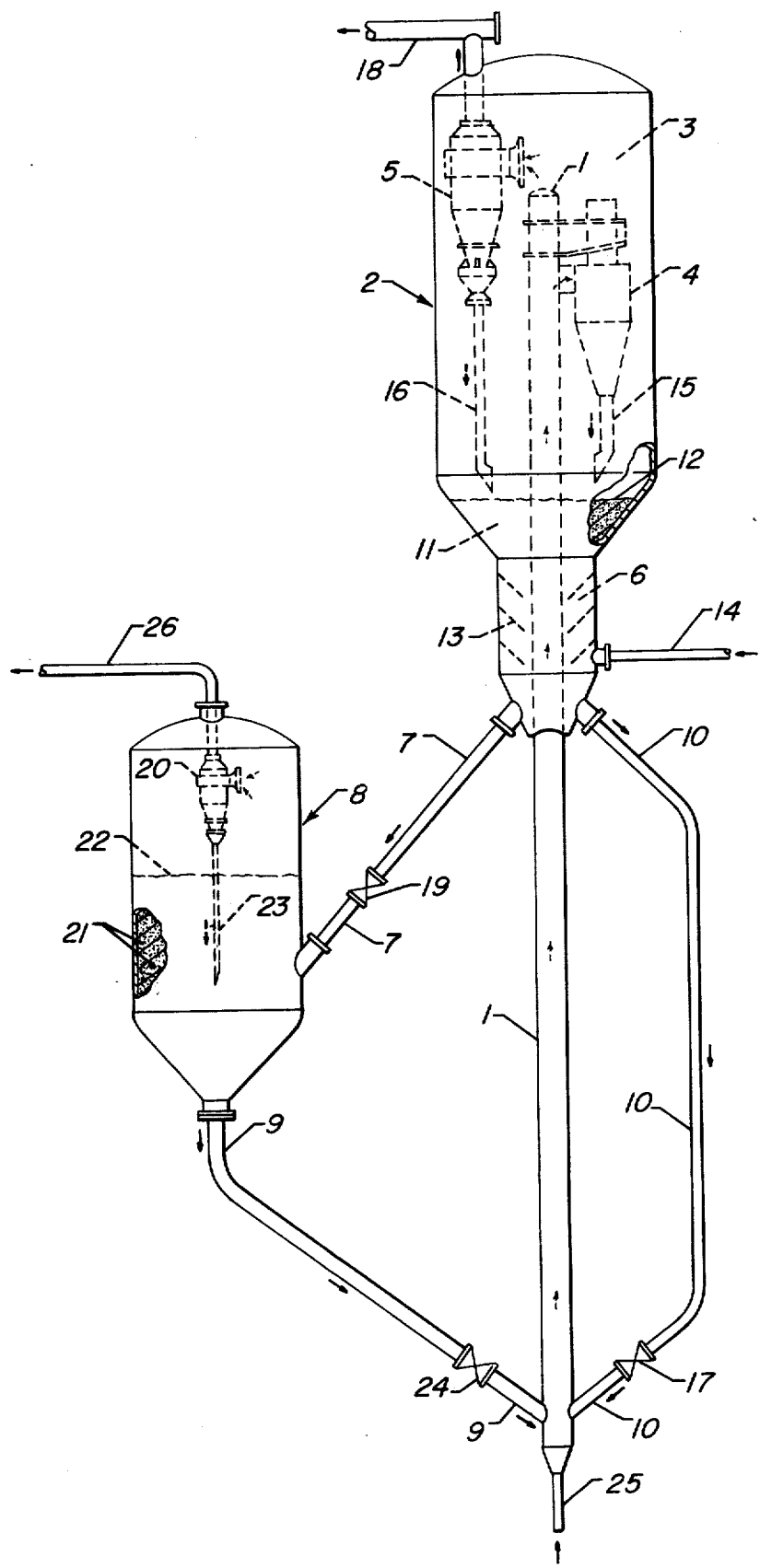

3,888,762

FLUID CATALYTIC CRACKING PROCESS

CROSS-REFERENCE TO RELATED APPLICATION

This application is a continuation-in-part application of my copending application Ser. No. 297,170 filed on Oct. 12, 1972 which is a continuation-in-part application of my application Ser. No. 139,433 filed on May 3, 1971, both now abandoned. All the teachings of said copending application are incorporated herein by specific reference thereto.

BACKGROUND OF THE INVENTION

1. Field of the Invention

The field of art to which this invention pertains is hydrocarbon processing. In particular this invention pertains to a fluidized catalytic process in which the activity of the catalyst is controllable to produce a desired product yield structure.

2. Description of the Prior Art

In a typical FCC process flow, finely divided regenerated catalyst leaves the regeneration zone at a certain temperature and contacts a feed stock in a lower portion of a riser reaction zone. While the resultant mixture passes up through the riser, conversion of the feed to lighter products and to coke deposited on the catalyst occurs. The effluent from the riser is discharged into a disengaging space or into cyclone separation means where hydrocarbon vapors are separated from spent catalyst. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feed stock to the riser reaction zone. Typically fractions such as light gases and gasoline are further separated and processed in a gas concentration process located downstream of the main column. Some of the fractions from the main column as well as those recovered from the gas concentration process may be recovered as final product streams. The separated spent catalyst passes through a stripping means in which a stripping gas, usually steam, countercurrently contacts the spent catalyst purging adsorbed and interstitial hydrocarbons from the catalyst. The spent catalyst containing coke leaves the stripping zone and passes into a regeneration zone where, in the presence of fresh regeneration gas, combustion of coke produces regenerated catalyst and flue gas containing carbon monoxide, carbon dioxide, water, nitrogen and perhaps a small quantity of oxygen. The amount of fresh regeneration gas to the regeneration zone is typically controlled by a predetermined temperature differential between the flue gas outlet section and either the dense bed temperature or the dilute phase temperature. Such a control scheme minimizes excess oxygen and allows only a small amount of afterburning, that is, only that amount characterized by the temperature differential, to take place. This control scheme does not permit controllable residual coke levels; indeed its purpose it to prevent getting "behind in burning" (of coke) by controlling to allow only a small amount of CO afterburning. When such a control scheme is used the amount of residual coke left on regenerated catalyst is largely a function of regeneration zone design, that is, how well gas and solids are mixed, the number of stages used, the residence time and the resulting temperature. Typically regenerated catalyst will contain less than about 0.5 wt. percent coke and usually from about 0.15 to 0.35 wt. percent coke while spent catalyst entering the regeneration zone generally contains from about 0.5 to 1.5 wt. percent coke. Flue gas is separated from entrained regenerated catalyst by cyclone separation means located within the regeneration zone and separated flue gas is passed from the regeneration zone typically to a carbon monoxide boiler where the chemical heat of carbon monoxide is recovered by combustion as a fuel for the production of steam. Regenerated catalyst which was separated from the flue gas is returned to the lower portion of the regeneration zone which is maintained as a dense bed of spent catalyst. Regenerated catalyst leaves this dense bed and as previously mentioned contacts the feed stock in a reaction zone. Generally, regenerated catalyst is not stripped of entrained flue gas prior to contacting the feed.

In this type of operation coke level on catalyst which contacts the hydrocarbon feed in the riser reaction zone is not an independent variable. Likewise, neither is catalyst activity an independent variable. While catalyst activity in an operating unit can be and is maintained by the addition of small amounts of fresh makeup catalyst, this changes catalyst activity only over a longer period of time and the refiner has no quick convenient method of controlling catalyst activity.

In the process of my invention catalyst activity can be controlled directly by returning a part of the catalyst separated from the reaction products to the riser reaction zone in a separate standpipe while sending the remainder of catalyst removed from the reaction zone through the normal path to the regenerator.

The following listing of patents includes relevant teachings considered by applicant as prior art:

| U.S. Patent | | Class | |
|---|---|---|---|
| | 2,700,015 | | 208–150 |
| | 2,847,364 | | 208–59 |
| | 2,892,773 | | 208–213 |
| | 2,965,454 | | 23–288 |
| | 3,071,538 | | 208–120 |
| | 3,344,060 | | 208–140 |
| | 3,380,911 | | 208–74 |

SUMMARY OF THE INVENTION

The invention claimed can be summarized as a fluid catalytic cracking process in which catalyst activity can be controlled by taking a portion of the catalyst which leaves the short-time dilute phase riser reaction zone and recirculating it as a separate stream to the inlet portion of the same riser.

In a broad embodiment my invention resides in a fluid catalytic cracking process in which the activity of a catalyst blend which contacts a hydrocarbon feed is controllable to produce a desired product yield structure which process comprises the steps of: (a) contacting a hydrocarbon feed stream with a catalyst blend, comprising a freshly regenerated catalyst stream from a regeneration zone and a separate recycle spent catalyst stream withdrawn from a spent catalyst stripping zone, in a short-time dilute-phase riser reaction zone; (b) passing the feed and catalyst blend in admixture through said reaction zone at catalytic cracking conditions, include the deposition of coke on the catalyst blend, to form spent catalyst and product components;

(c) discharging the mixture into a separation zone at separation conditions to effect the separation of catalyst from product components and any unreacted feed; (d) recovering product and any unreacted feed and passing spent catalyst from said separation means into a spent catalyst stripping zone at stripping conditions to remove adsorbed and interstitial hydrocarbons therefrom to form stripped spent catalyst containing coke thereon; (e) passing a first portion of stripped spent catalyst from said stripping zone into a regeneration zone maintained at oxidizing conditions and therein oxidizing coke from said catalyst to produce freshly regenerated catalyst; (f) passing freshly regenerated catalyst to said riser of step (a) above; and, (g) passing a second portion of stripped spent catalyst from the stripping zone into said riser as the separate recycle spent catalyst stream of step (a) above at a rate to control the activity of the catalyst blend necessary to produce a desired yield structure.

BRIEF DESCRIPTION OF THE DRAWING

The attached drawing shows the essential features of the process of this invention including the short-time dilute-phase riser reaction zone 1, vessel 2, separation zone 3, spent catalyst stripping zone 6, spent catalyst standpipe 7, regenerator 8, freshly regenerated catalyst conduit 9, and recycle catalyst conduit 10 which is connected to the riser at the lower portion thereof and to the spent catalyst stripping zone 6.

The riser reaction zone 1 is directly connected to vessel 2 which as shown in the drawing is essentially a cylindrical structure which contains: a separation zone 3 in which cyclone separators 4 and 5 are located, a bed of catalyst 11 having an interface at 12, and a spent catalyst stripping zone 6 which contains baffles 13 and into which flows a stripping medium, generally steam, through conduit 14. Cyclone separators 4 and 5 have diplegs 15 and 16 respectively which pass catalyst separated from effluent material passing out of riser 1 downward toward catalyst bed 11. Hydrocarbon vapors pass out of separator 5 and out of vessel 2 through hydrocarbon vapor line 18.

Recycle catalyst conduit 10, connected to vessel 2 and the riser reaction zone 1, contains a slide valve 17 which controls the rate of recycle catalyst flowing into the riser from the spent catalyst stripping zone 6. Recycle catalyst is stripped of adsorbed and interstitial hydrocarbons in the stripping zone prior to its passage into the riser reaction zone.

Spent catalyst standpipe 7 connects vessel 2 and the regenerator 8. This conduit can contain a slide valve 19 which maintains control of flow of catalyst passing from the catalyst bed 11 within vessel 2 into the regenerator 8.

Regeneration zone 8 contains the cyclone separator 20 which separates any entrained catalyst from the flue gas which is removed from the regenerator via outlet conduit 26. Catalyst separated from the flue gas is recirculated back via dipleg 23 within the regeneration zone to dense bed 21 which has an interface at 22. Not shown on the regenerator is the oxygen inlet stream through which an oxygen-containing stream passes to effect combustion of coke on the catalyst to carbon dioxide. The freshly regenerated catalyst conduit 9 contains a slide valve 24 which controls the rate of freshly regenerated catalyst passing into the lower portion of the riser reaction zone 1.

At the bottom portion of the riser reaction zone 1 is a fresh feed stock inlet 25 through which fresh feed and/or recycle materials can pass contacting both freshly regenerated catalyst and recycle catalyst. The feed is vaporized causing the catalyst passed into the riser to be fluidized and carried in an upward direction through the riser which enters into vessel 2.

The riser reaction zone enters vessel 2 at its lowermost portion through catalyst stripping zone 6 and continues into separation zone 3 which is contained within vessel 2. The effluent from riser reaction zone 1 could be discharged directly into separation zone 3 and some degree of catalyst and hydrocarbon vapor separation would be effected. It is preferred, however, to discharge the riser reaction zone effluent directly into cyclone separators within the separation zone as shown in the drawing to effect an immediate positive separation of the catalyst and hydrocarbons thereby quenching the reaction and avoiding undesirable secondary reactions.

During normal operations a feed stock passes through feed inlet 25 and contacts a catalyst blend comprising desired quantities of freshly regenerated catalyst passing through conduit 9 and recycle catalyst passing through conduit 10. The hot catalyst causes the feed stock to be vaporized which in turn causes the entire mixture of feed and catalyst to be carried in an upward direction through riser 1 which extends into reaction vessel 2. In some instances the catalyst passing into the riser will not be hot enough to cause the feed stock to vaporize. In these instances the freshly regenerated catalyst feed rate to the reaction zone can be increased in order to allow a larger quantity of relatively hot catalyst to effect the vaporization of feed stock. In instances in which the ratio of freshly regenerated catalyst to recycle catalyst is not desired to be altered, the recycle catalyst may be preheated before passage to the riser reaction zone.

The catalyst and hydrocarbon mixture exits riser 1 near its top portion and enters cyclone separator 4 wherein hydrocarbon vapors and catalyst are separated. Separated catalyst is passed through dipleg 15 downward toward dense bed 11 and vapors pass out the top portion of the separator into separation zone 3. Hydrocarbon vapors with separator entrained catalyst pass from separation zone 3 into cyclone separtor 5 which returns separated catalyst downward toward dense bed 11 and which directs hydrocarbon vapors out of vessel 2 through hydrocarbon vapor line 18.

Catalyst in dense bed 11, flowing in a downward direction through vessel 2, passes through stripping zone over baffles 13 and is stripped by a countercurrent stream of stripping medium which enters the stripping zone through line 19.

Stripped catalyst can leave vessel 2 through spent catalyst standpipe 7 and recycle catalyst conduit 10. Slide valves 19 and 17 on these respectively control the amounts of catalyst flowing through the standpipe and conduit. Catalyst flowing through conduit 7 enters dense bed of catalyst 21 in regeneration zone 8 which is maintained at oxidizing conditions. Coke is oxidized from the catalyst to produce freshly regenerated catalyst which leaves regeneration zone 8 through conduit 9 and passes at a flow rate controlled by slide valve 24 to the bottom portion of riser reaction zone 1. Flue gas resulting from the oxidation of coke and containing any entrained catalyst enters cyclone separator 20. Separated flue gas passes from the separator and out of the regeneration zone through outlet conduit 21 while separated catalyst is returned to dense bed 21 via dipleg 23. Although only one cyclone separator is shown, multiple cyclones in parallel or series flow combinations could be used if desired to effect a higher degree of separation efficiency.

The recycle catalyst conduit 10 and spent catalyst standpipe 7 connecting vessel 2 and regeneration zone 8 should be separate lines so that independent control of recycle spent catalyst can be maintained. In some instances one conduit can connect vessel 2 with riser reaction zone 1 with a line somewhere along the conduit through which a stream of catalyst can be passed into the regenerator. Other methods of returning recycle catalyst to the riser reaction zone are contemplated.

spent catalyst recycled back to the riser reaction zone and can be increased by a decrease in the amount recycled. Thus the refiner can switch his operation from one maximizing fuel oil production to one maximizing gasoline yields or to one where maximum LPG is desired by directly changing the coke level and hence activity of the catalyst. An example of these possible operations is shown in Table 1 below. Operations at intermediate coke levels are of course possible as well.

The first operation shown in Table 1 is an LPG operation in which maximum LPG yield is produced at the Table 1

PRODUCT YIELDS AT DIFFERENT RESIDUAL COKE LEVELS

| Type of FCC Operation | LPG | Gasoline | LCO (fuel oil) | Effect of residual coke at LPG conditions |
|---|---|---|---|---|
| Reactor temperature, °F. | 970 | 970 | 970 | 970 |
| Feed Preheat Temp., °F. | 375 | 600 | 600 | 375 |
| Regen.Cat.Delivery Temp., °F. | 1350 | 1350 | 1350 | 1350 |
| Coke on Catalyst, wt. % | 0.02 | 0.11 | 0.62 | 0.62 |
| Yield Distribution, % on Fresh Feed | | | | |
| Conversion, LV% | 85.7 | 75.0 | 64.4 | 77.0 |
| $C_3$-$C_4$ (LPG), LV% | 38.2 | 26.3 | 20.4 | 31.4 |
| Gasoline, LV % (380° F. at 90% over) | 52.0 | 62.3 | 48.3 | 58.3 |
| Light Cycle Oil, LV % | 11.4 | 20.0 | 30.6 | 18.0 |
| Clarified Slurry Oil, LV % | 5.0 | 5.0 | 5.0 | 5.0 |
| Coke, wt. % | 6.8 | 3.8 | 5.3 | 6.8 |

DESCRIPTION OF THE INVENTION

It is well known in the art that the level of residual coke on catalyst which contacts a hydrocarbon feed in a reaction zone has a great influence on the conversion and product yield distribution obtained. This is especially true where short-time dilute-phase riser reaction zones are employed since the catalyst and hydrocarbon are in intimate contact for only about 10 seconds or less. Additionally one trait of zeolite-containing fluid catalytic cracking catalysts in particular is their susceptibility to yield selectivity change as carbon builds up on the catalyst. With these catalysts, increasing carbon not only reduces activity but changes the yield distribution.

At constant reactor temperature an increase in coke level on catalyst containing a hydrocarbon feed will therefore reduce conversion and gasoline yield and increase cycle oil (fuel oil) yield. A decrease in coke on catalyst will increase conversion at the expense of fuel oil yield and increase gasoline yield. By contacting a hydrocarbon feed in the riser reaction zone with catalyst having very low coke content, it is possible to change the yield structure in the direction of increased gas yields (LPG) at the expense of gasoline yield. The process of our invention not only recognizes the effect of coke on catalyst activity and hence on yields but allows the refiner to directly vary catalyst activity by controlling coke on catalyst and thereby to control product yields. Activity of catalyst contacting the hydrocarbon feed can be decreased by increasing the amount of indicated operating conditions using a catalyst having very low coke. At the very low coke level of <0.02 wt. percent the high-activity catalyst which contacts the feed in the riser reaction zone results in higher conversion and cracks part of the gasoline present to produce this higher LPG yield. At an increased coke level of 0.11 wt. percent as shown in the gasoline operation, with the same reactor temperature, less active catalyst contacts the feed in the riser reaction zone and as a result the conversion and LPG yield are reduced but the yield of gasoline is increased. As the coke level is further increased as shown in the LCO operation to about 0.6 wt. percent producing even less active catalyst, the conversion and yields of LPG and gasoline are decreased but the yield of light cycle oil (fuel oil) is increased. The effect of coke on product yields is further illustrated in the last column of Table 1. Here the operating conditions are the same as those of the LPG operation except for the high residual coke level which is the same as that of the LCO operation. As shown, the conversion and LPG yield are less than those for the LPG operation while the gasoline and LCO yields are higher. This is attributable to less active catalyst caused by the higher coke level.

The zeolite-containing catalysts are preferred for the process of this invention because their higher activity permits higher conversion and yields of more valuable products as compared to the well known amorphous catalysts. Amorphous catalysts can, however, still be employed. The term "catalyst activity" as used in this specification is quite familiar to those skilled in the art and refers to the ability of the catalyst to convert feed stock to products at a particular set of processing conditions. A high-activity catalyst requires less severe processing conditions than does a low-activity catalyst to achieve desired quantities of particular products.

The higher activity zeolite-containing catalysts additionally permit the most advantageous use of short-time dilute-phase riser reaction zones. Since desired conversion levels can now be obtained with shorter catalyst residence times, secondary reactions of converted products to less desirable products are greatly reduced. The term short-time dilute-phase riser reaction zone as used herein means a fluid catalytic cracking reaction zone which is characterized by the absence of a dense catalyst bed, by cocurrent flow of catalyst and hydrocarbon, and by short catalyst residence time. Reaction conditions which can be employed include a temperature between about 900° and 1100° F., a pressure of about atmospheric to about 40 psig. and a catalyst residence time of less than 10 seconds. Additionally a diluent such as steam, nitrogen, naphtha, or other light hydrocarbon having a boiling point generally lower than naphtha can be used to lower the partial pressure of the hydrocarbon feed stock for the purpose of increasing yields of more valuable products. The riser reaction zone can vary in dimensions and preferably has a length to diameter ratio in the range of from about 2.5:1 up to 100:1 or higher. Preferably, the range is from about 10:1 to about 35:1 but it may vary depending on the operation taking place. The riser is generally vertically positioned and empties into either a disengaging space which may contain a fluidized dense bed or directly into one or more cyclone separators which can effect an immediate separation of the effluent stream into catalyst and reaction products. As an additional means of avoiding or minimizing secondary reactions which lead to less valuable products it is preferred that the riser empty directly into one or more cyclone separators which can be housed within the disengaging space. Indeed if timely separation of hydrocarbon and catalyst does not occur before the occurrence of a significant amount of aftercracking, at least a portion of the selectivity advantage of the zeolite catalyst and the short-time dilute-phase riser reaction zone can be lost.

Feed stocks can vary depending on the operation taking place. Generally the feed stock will be a gas oil or in some instances a reduced crude. Additionally a portion of the product materials may be recycled to the riser reaction zone. The recycle material may be a heavy cycle oil, light cycle oil, recycle gasoline or a naphtha recycle stream.

The regeneration zone is where coke is oxidized from the spent catalyst in the presence of fresh regeneration gas to produce regenerated catalyst. Spent catalyst as used in the specification is catalyst which has been contaminated with coke in a reaction zone. Actually the term "spent catalyst" is a misnomer since coke-contaminated catalyst generally still possesses some catalytic activity. Regenerated catalyst is catalyst from which coke has been removed by oxidation. The term fresh regeneration gas shall include any oxygen-containing gas such as air or oxygen enriched or deficient air which passes into the regeneration zone to allow oxidation of coke within the regeneration zone. Spent catalyst entering the regeneration zone generally contains from about 0.5 to about 1.5 wt. percent coke and regenerated catalyst will generally contain less than about 0.5 wt. percent coke and usually from about 0.02 to about 0.35 wt. percent coke.

Generally the regeneration (coke oxidation) is done in a single dense bed which is maintained in the bottom portion of the regeneration zone by limiting the superficial velocity of the incoming fresh regeneration gas and provisions are made for recovering and returning to the dense bed catalyst entrained in the flue gas effluent which passes from the dense bed. This is generally accomplished by passing the effluent flue gas containing entrained catalyst through one or more cyclone separators located in the dilute phase which is positioned above and in connection with the dense bed. Attempts to achieve low residual carbon levels on regenerated catalyst and to reduce catalyst inventories and fresh catalyst makeup rates have been made by effecting a staged regeneration within the regeneration zone. Such staging has generally involved multiple dense beds with a common dilute phase positioned above and in connection with them. Either a single or multi-stage type of regeneration zone may be used in the process of our invention. Preferred oxidizing conditions for the regeneration zone include temperature from about 1150° to about 1400° F., pressures from about atmospheric to about 50 psig. and catalyst residence times within the regeneration zone of from about 2 to about 5 minutes.

The catalyst and hydrocarbon mixture leaving the riser reaction zone passes into cyclone separators which effect the separation of solid catalyst from hydrocarbon. The use of such separating devices is quite common in the art of fluid catalytic cracking and no further description of them is deemed necessary. Other mechanical devices capable of effecting such a separation could of course be used.

The catalyst after having been separated from the reaction products and unreacted feed material is stripped in order to reduce yield loss. The stripping is accomplished by passing a stripping stream generally comprising an inert gaseous material or steam past the catalyst in a counter-current manner to strip off adsorbed or interstitial hydrocarbons from the catalyst prior to its being passed into the regeneration zone or returned to the riser reaction zone. Stripping operations are generally performed in a baffled stripper or other apparatus in which efficient contacting of a stripping stream and catalyst can occur. Design of strippers is well known in the art and is not thought to be necessary to go into a more further detailed description of their operations or their construction.

The requirement for the separate passage of freshly regenerated and spent recycle catalyst into the riser is primarily to obtain better control over the ratio of freshly regenerated to spent recycle catalyst sent to the riser reaction zone. The ratio of freshly regenerated to spent catalyst can be controlled easily and instantaneously by opening and closing the slide valves on the conduits carrying the two separate streams.

I claim as my invention:

1. A fluid catalytic cracking process in which the activity of a catalyst blend which contacts a hydrocarbon feed is controllable to produce a desired product yield structure which process comprises the steps of:
    a. contacting a hydrocarbon feed stream with catalyst blend, comprising a freshly regenerated catalyst stream from a regeneration zone and a separate recycle spent catalyst stream withdrawn from a spent catalyst stripping zone, in a short-time dilute-phase riser reaction zone;
    b. passing the feed and catalyst blend in admixture through said reaction zone at catalytic cracking conditions, including the deposition of coke on the catalyst blend, to form spent catalyst and product components;

c. discharging the mixture into a separation zone at separation conditions to effect the separation of catalyst from product components and any unreacted feed;

d. recovering product and any unreacted feed and passing spent catalyst from said separation means into a spent catalyst stripping zone at stripping conditions to remove adsorbed and interstitial hydrocarbons therefrom to form stripped spent catalyst containing coke thereon;

e. passing a first portion of stripped spent catalyst from said stripping zone into a regeneration zone maintained at oxidizing conditions and therein oxidizing coke from said catalyst to produce freshly regenerated catalyst;

f. passing freshly regenerated catalyst from said regeneration zone to said riser of step (a) above; and, g. passing simultaneously a second portion of stripped spent catalyst from the stripping zone into said riser as the separate recycle spent catalyst stream of step (a) above at a rate to control the activity of the catalyst blend necessary to produce a desired yield structure.

2. The process of claim 1 further characterized in that the catalytic cracking conditions include a temperature within the range of about 900° to about 1100° F., a pressure within the range of about atmospheric to about 40 psig., and a hydrocarbon residence time of less than 10 seconds.

3. The process of claim 2 further characterized in that the catalytic cracking conditions include the presence of a diluent to reduce the partial pressure of the hydrocarbon feed.

4. The process of claim 1 further characterized in that said oxidizing conditions in the regeneration zone include a temperature within the range of about 1150° to 1400° F., a pressure from about atmospheric to about 50 psig., and a catalyst residence time of from about 2 to about 5 minutes.

5. The process of claim 4 further characterized in that the regeneration zone comprises a single dense bed of catalyst with a dilute phase positioned above and in connection with it.

6. The process of claim 4 further characterized in that the regeneration zone comprises multiple dense beds of catalyst with a common dilute phase positioned above and in connection with them.

7. A fluid catalytic cracking process in which the activity of a zeolite-containing catalyst blend is controllable to produce a desired product yield structure which process comprises the steps of:

a. contacting a hydrocarbon feed stream with a catalyst blend, comprising a freshly regenerated catalyst stream from a regeneration zone and a separate recycle spent catalyst stream withdrawn from a spent catalyst stripping zone, in a short-time dilute-phase riser reaction zone;

b. passing the feed and catalyst blend in admixture through reaction zone at catalytic cracking conditions, including the deposition of coke on the catalyst blend, a temperature within the range of about 900° to 1100° F., a pressure from about atmospheric to 40 psig., and a hydrocarbon residence time of less than 10 seconds, to produce spent catalyst and product components;

c. discharging the mixture directly into cyclone separation means to effect the separation of catalyst from product components and any unreacted feed and recovering product and any unreacted feed;

d. passing spent catalyst from said separation means into a spent catalyst stripping zone at stripping conditions to remove adsorbed and interstitial hydrocarbons therefrom to form stripped spent catalyst containing coke thereon;

e. passing a first portion of stripped spent catalyst from said stripping zone into a regeneration zone maintained at oxidizing conditions including a temperature from about 1150° to about 1400° F., a pressure from about atmospheric to about 50 psig., and a catalyst residence time of from about 2 to about 5 minutes and therein oxidizing coke from said catalyst to produce freshly regenerated catalyst;

f. passing freshly regenerated catalyst from said regeneration zone to said riser of step (a) above; and, g. passing simultaneously a second portion of stripped spent catalyst from the stripping zone into said riser as the separate recycle spent catalyst stream of step (a) above at a rate to control the activity of the catalyst blend necessary to produce a desired yield structure.

8. The process of claim 7 further characterized in that the catalytic cracking conditions include the presence of a diluent to reduce the partial pressure of the hydrocarbon feed.

* * * * *